March 5, 1963 F. MINECK 3,079,695
WHEEL ALIGNMENT MACHINE
Filed March 7, 1960 6 Sheets-Sheet 1

INVENTOR.
FRED MINECK.
BY
Willard S. Grover
ATTORNEY.

March 5, 1963 F. MINECK 3,079,695
WHEEL ALIGNMENT MACHINE
Filed March 7, 1960 6 Sheets-Sheet 2

INVENTOR.
FRED MINECK.
BY
Willard S. Grout
ATTORNEY.

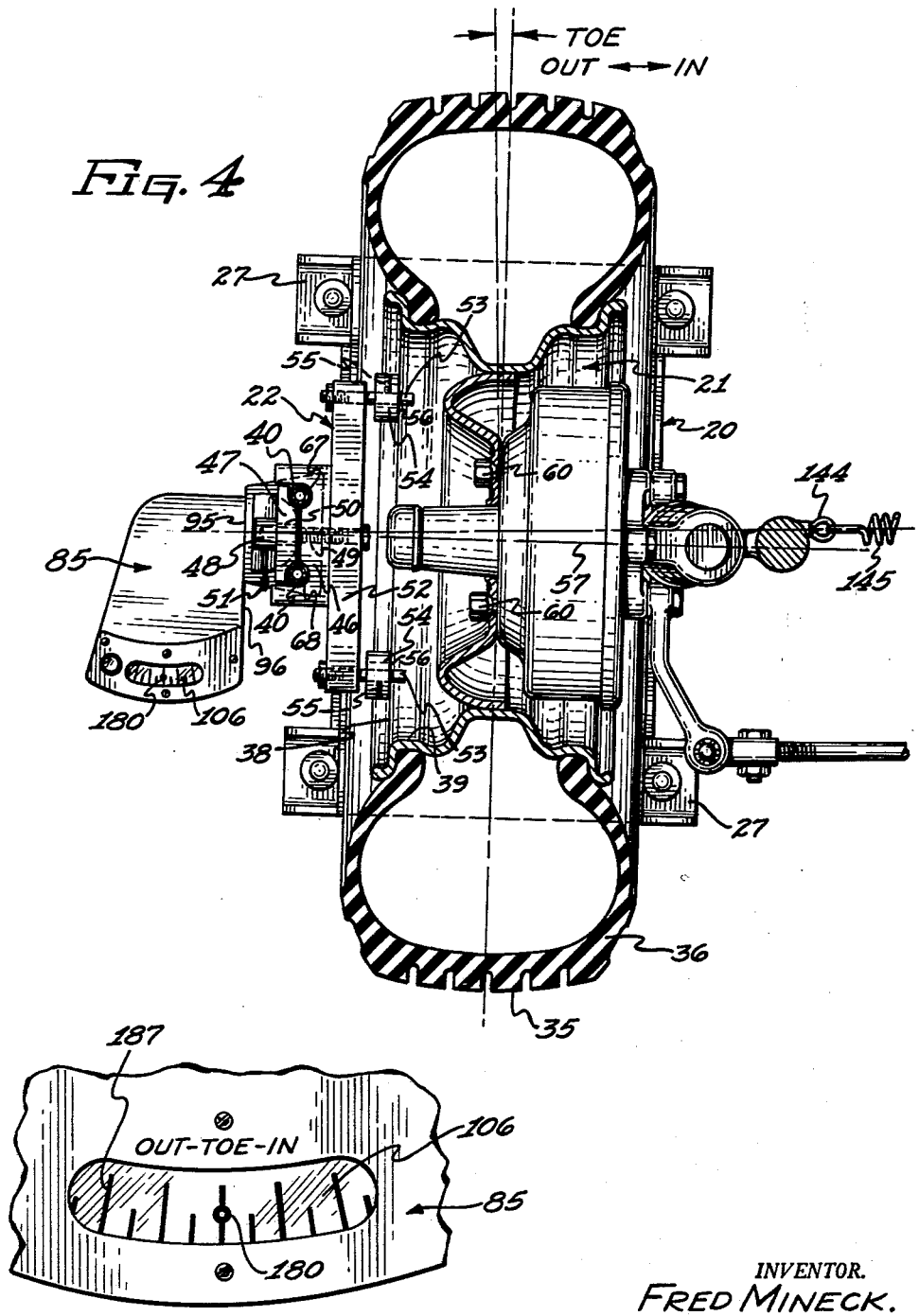

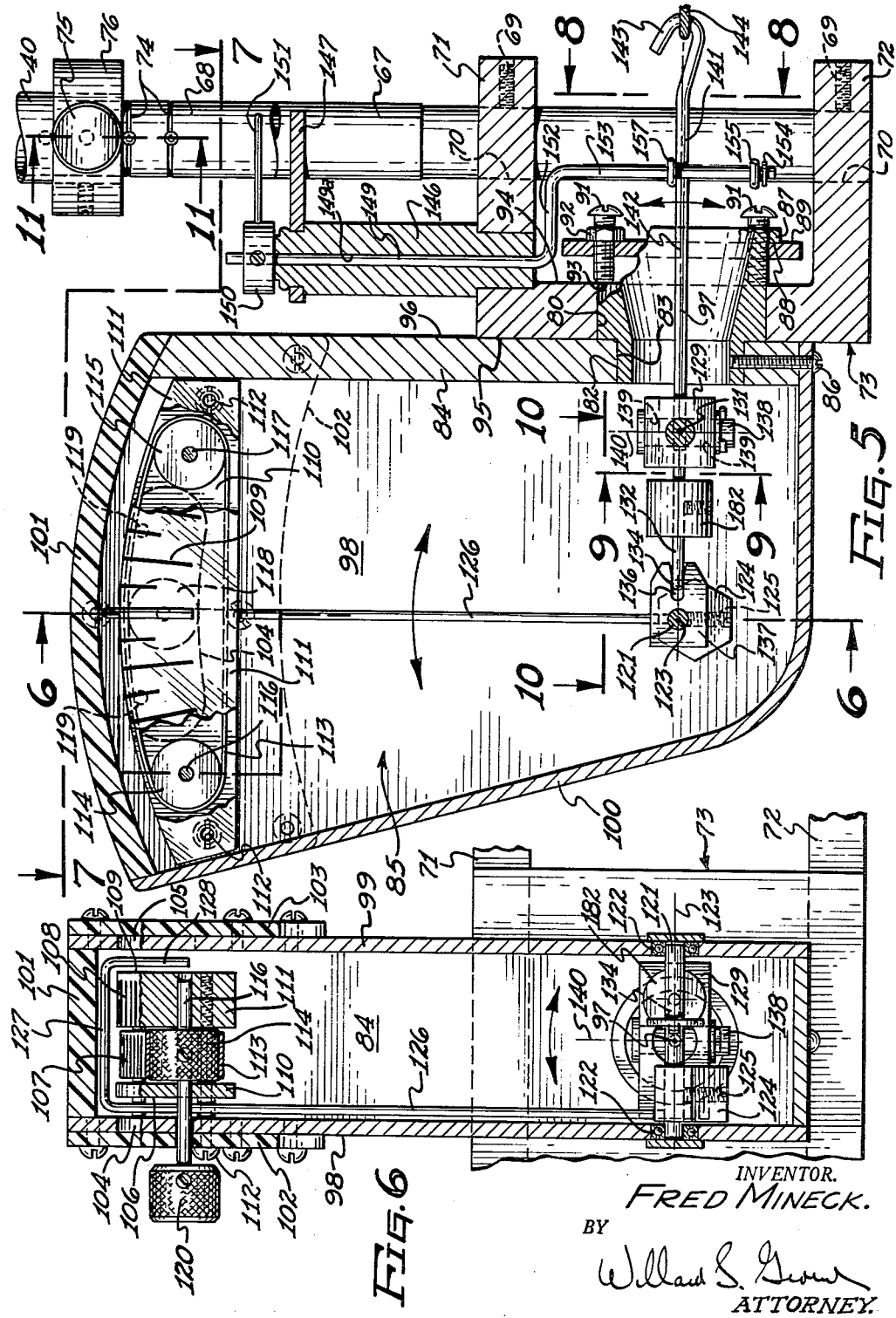

March 5, 1963
F. MINECK
3,079,695
WHEEL ALIGNMENT MACHINE
Filed March 7, 1960
6 Sheets-Sheet 5
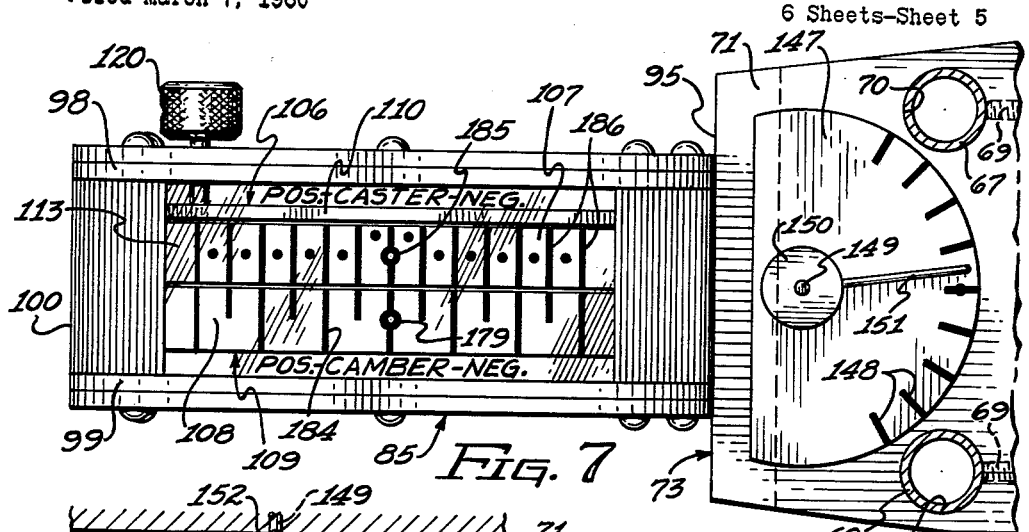
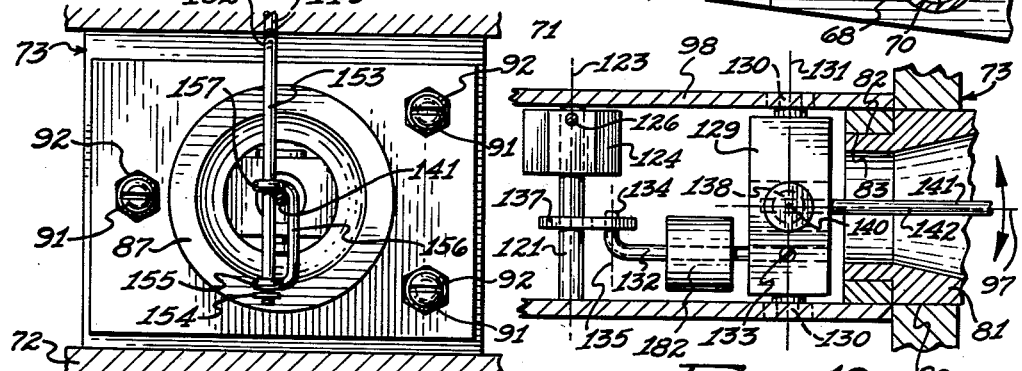
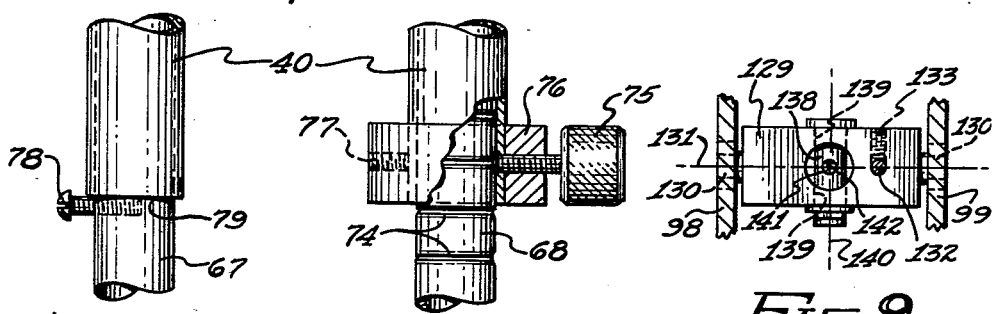
INVENTOR.
FRED MINECK.
BY
William S. Grove
ATTORNEY.

March 5, 1963

F. MINECK 3,079,695

WHEEL ALIGNMENT MACHINE

Filed March 7, 1960

INVENTOR.
FRED MINECK.
BY
Willard S. Trowe
ATTORNEY.

United States Patent Office 3,079,695  
Patented Mar. 5, 1963

3,079,695  
WHEEL ALIGNMENT MACHINE  
Fred Mineck, Phoenix, Ariz., assignor, by mesne assignments, to Bee Line Company, Davenport, Iowa, a corporation of Iowa  
Filed Mar. 7, 1960, Ser. No. 13,105  
5 Claims. (Cl. 33—203.12)

This invention pertains to improvements in wheel alignment testing machines and is particularly directed to such a machine for testing the caster, camber and toe for front wheel assemblies of motor vehicles.

One of the objects of this invention is to provide a wheel alignment machine designed to be substantially completely portable.

Another object is to provide a wheel alignment machine of portable character which operates from the normal flat floor but which does not require that the floor be perfectly level.

A further object is to provide a wheel alignment machine in which the front wheels are supported on turntables which are supported on universal casters on the floor surface so that the wheels follow their own true arc without rotation of the wheel thus eliminating any binding or restraint of the front wheels for pivoting freely.

It is also an object to provide a wheel alignment machine which is adapted to handle any width of tread with equal facility.

The machine of this invention is characterized by portable measuring devices supported solely on the wheel of the vehicle in which all measurements are taken from the felloe of the wheel rim.

Another object is to provide in a wheel alignment machine a dial indicating meter for camber and caster which turns on a center point to also be used to indicate toe.

A further object is to provide a rack and tool tray fitting over the two turntable units and the whole assembly then becomes mobile on the casters.

And a further object of this invention is to provide a wheel alignment machine which functions completely independent of indicating levels of any kind or pendulums.

And it is also an object to construct the above wheel alignment machine so that both the turntables and the indicating units on the wheel felloes turn as a unit to give camber, caster and toe readings and degree of wheel turn.

The device here contemplated also functions accurately independently of tire pressure and tire wear since all basic measurements are made from the felloe of the wheels.

The apparatus is also well adapted to checking the alignment of the rear wheels of motor vehicles.

Further features and advantages of this invention will appear from a detailed description of the drawings in which:

FIG. 4 is an enlarged fragmentary sectional view on the line 4—4 of FIG. 1.

FIG. 4a is an enlarged fragmentary view of the toe indicating dial.

FIG. 5 is an enlarged section on the line 5—5 of FIG. 2.

FIG. 6 is a sectional view on the line 6—6 of FIG. 5.

FIG. 7 is an enlarged plan view on the line 7—7 of FIG. 5.

FIG. 8 is an enlarged section on the line 8—8 of FIG. 5.

FIG. 9 is an enlarged fragmentary section on the line 9—9 of FIG. 5.

FIG. 10 is an enlarged fragmentary section on the line 10—10 of FIG. 5.

FIG. 11 is an enlarged fragmentary view partly in section on the line 11—11 of FIG. 5.

FIG. 12 is an enlarged plan view of the tire supporting turntable.

FIG. 13 is an end elevation of the turntable shown in FIG. 12.

FIG. 14 is a section on the line 14—14 of FIG. 12.

FIG. 15 is a side elevation of the wheel alignment machine elements set up with the initial calibration frame mounted on the juxtapositioned turntables.

FIG. 16 is an end elevation of the apparatus shown in FIG. 15.

Figure 1:
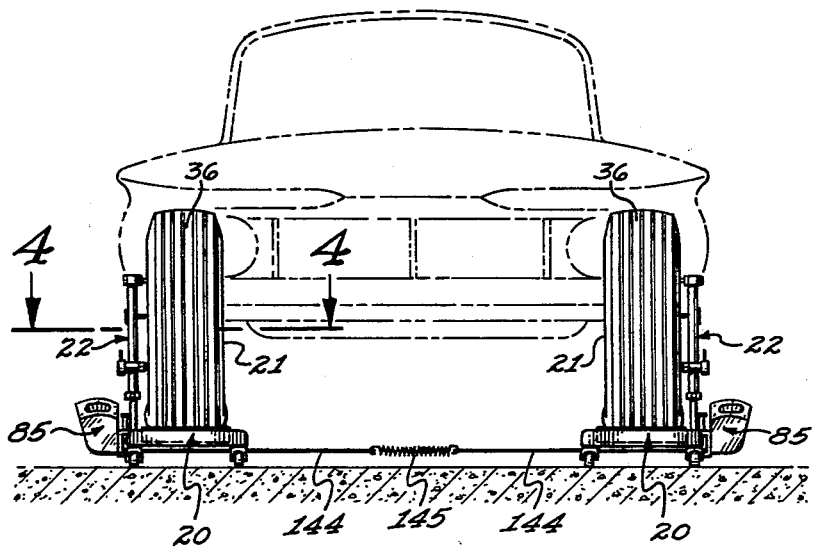
FIG. 1 is a front elevation of a wheel alignment machine incorporating the features of this invention.
Figure 2:
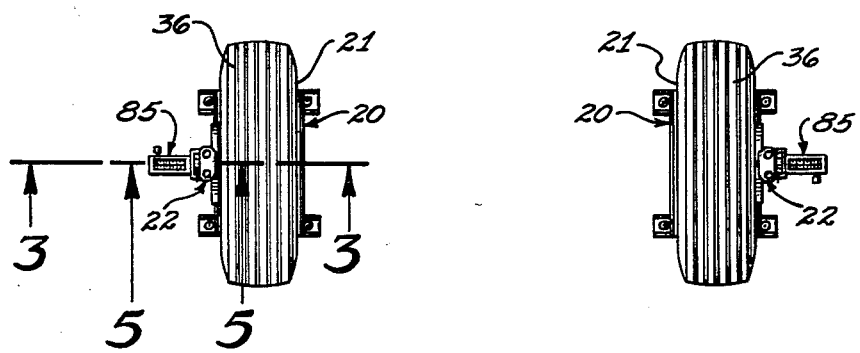
FIG. 2 is a plan view of the apparatus shown in FIG. 1.

As an example of one embodiment of this invention, there is shown in FIGS. 1 and 2 the basic elements of the wheel alignment machine incorporating the features of this invention. The apparatus comprises turntable units 20, one for supporting each of the wheels 21 of the motor vehicle to be tested for alignment, the dial indicator frame units 22 carried on the motor vehicle wheels, and the interconnecting tension cord 144—145—144 between the dial indicator frame units 22.

Since the turntable units 20 and the dial indicator frame units 22 are identical, a detailed description of one will suffice for both. Referring particularly to FIGS. 12, 13 and 14, each of the turntable units 20 comprises a pair of laterally spaced rails 25 securely welded at 26 to the laterally disposed U-shaped end members 27 which are suitably mounted on casters 28 having rollers 29 adapted to engage and roll on the floor surface 30. A tire contacting plate 31 has end portions 32 fixed to the end members 27 and a depressed V-shaped intermediate portion 33 having sloping tire engaging portions 34 located between the rails 25 and adapted to engage the tread surface 35 of the tire 36 at the points 37. In this way the turntables are locked to the tire 36 so that the wheels may be turned from side-to-side while the casters 28 roll about on the floor surface 30 during the wheel alignment tests.

Figure 3:
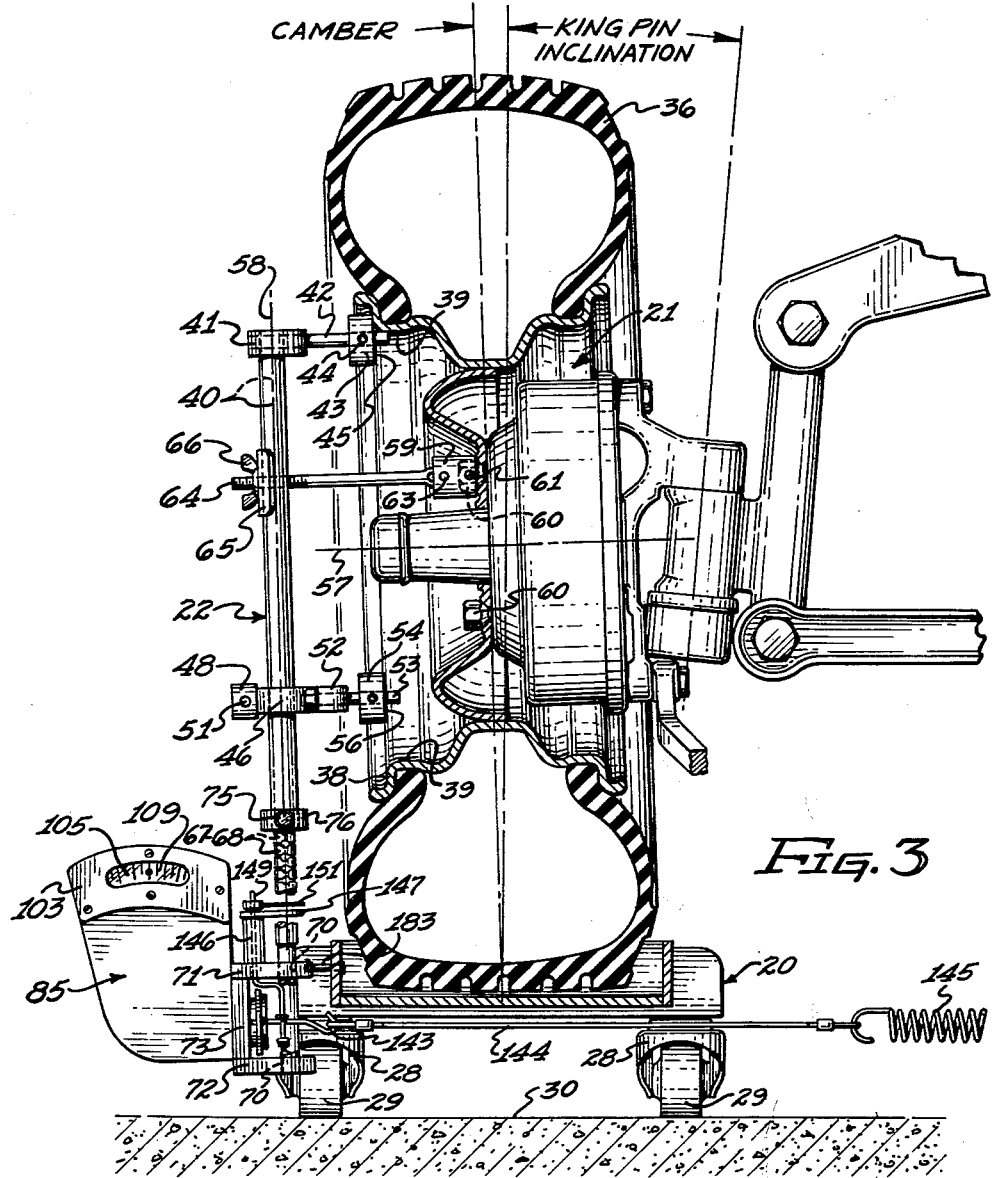
FIG. 3 is an enlarged fragmentary sectional view on the line 3—3 of FIG. 2.
Figure 3A:
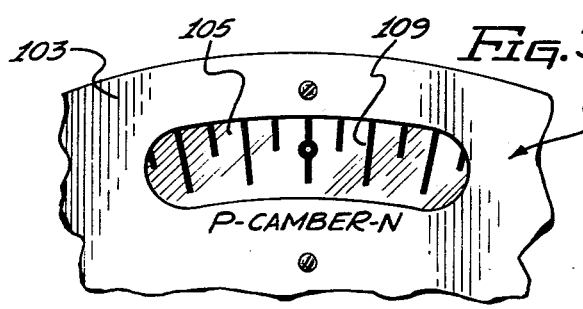
FIG. 3a is an enlarged fragmentary view of the camber indicating dial.

Referring particularly to FIGS. 3 and 4, each of the dial indicator frame units 22 is supported solely by a three-point locating arrangement engaging the felloe 38 and adjacent bore surface 39 of the wheel 21. To this end there is provided a pair of parallel tubes 40 having their upper ends fixed to the block 41 in which is fixed the locating pin 42 having its outer end diameter portion adapted to engage the bore surface 39 of the wheel 21. An abutment collar 43 is mounted for longitudinal adjustment on the locating pin 42 and clampable in adjusted position on the pin 42 by a clamping screw 44, the collar 43 having a radially disposed locating abutment surface 45 adapted to engage the felloe 38 of the wheel 21.

Intermediate the ends of the parallel tubes 40 is mounted the adjustable sliding block 46 having associated therewith a clamp 47 and a clamp locking screw 48 threaded at 49 in the block 46 and passing through a clearance hole 50 in the clamp 47, the clamp locking screw having an operating handle 51 so that the block 46 may be securely clamped to the parallel tubes 40 at any desired longitudinal position. Fixed to the block 46 is the laterally disposed bar 52 in the outer ends of which are fixed the locating pins 53 whose outer end diameter portions are adapted to engage the bore surface 39 of the wheel 21. Abutment collars 54 are mounted for longitudinal adjustment on the locating pins 53 and clampable in adjusted position on the pins 53 by the clamping screws 55, the collars 54 having radially disposed locating abutment surfaces 56 adapted to engage the felloe 38 of the wheel 21. The sliding block 46 is adjusted outwardly until all three pins 42 and 53 engage the bore surface 39 of the wheel to radially position the parallel tubes 40 with regard to the wheel axis 57 while the collars 43 and 54 are positioned on the pins 42 and 53 so that the parallel tubes 40 have their axes 58 parallel to the plane defined by the surface of the felloe 38. A suitable clamp device may be provided to hold the parallel tube frame with the pins 42—53 and collar abutment surfaces 45—56 against the surfaces 38 and 39 of the wheel 21. As an example of one form of such a clamp device, there is provided a socket piece 59 adapted to fit over a wheel nut 60 and to be locked thereto by a suitable clamp screw 61. A draw rod 64 is pivotally connected at its inner end to a cross pin 63 fixed in the socket piece 59 and has a threaded outer end extending through a clearance hole in a clamp plate 65 which bridges across the parallel tubes 40. A wing nut 66 is mounted on the threaded portion 64 of the draw rod 62 and when tightened against the plate 65 holds the parallel tube frame structure described securely to the wheel 21.

Referring particularly to FIGS. 3, 5 and 11, telescopically slidable in the lower ends of the parallel tubes 40 are the bars 67 and 68 which are rigidly fixed in the bores 70 formed in the arms 71 and 72 of the U-shaped bracket 73 by the set screws 69. The upper portion of the bar 68 is provided with a series of longitudinally spaced annular grooves 74 forming graduations of predetermined spacing and common to both dial indicator frame units so as to facilitate the correct positioning of the bars 67—68 in the tubes 40. A suitable locking thumb screw 75 threadedly mounted in the collar 76 rigidly fixed to the lower end of a tube 40 by a set screw 77 serves to clamp the tubes 40 and bars 67—68 in relative adjusted position as required. A basic stop screw 78 in the bar 67 abuts against the end 79 of one of the tubes 40 to limit inward telescopic movement of said bars 67—68 into the tubes 40.

The U-shaped bracket 73 is provided with a bore 80 in which is journaled the trunnion bushing 81 which has a reduced diameter portion 82 which is rigidly fixed in the bore 83 of the back plate 84 of the dial indicator 85 by a suitable screw 86. The bushing 81 has a flange 87 having an abutment surface 88 which is adapted to engage the surface 89 of a friction washer in which are carried a series of circumferentially spaced back-up screws 91 having lock nuts 92. The ends 93 of the screws 91 abut against the surface 94 of the U-shaped bracket 73 and when properly adjusted, provide a frictional sliding engagement between the surfaces 88—89 and the surface 95 of the U-shaped bracket 73 and the surface 96 of the back plate 84 of the dial indicator 85 so that the dial indicator may be rocked about the axis 97 of the bore 83, the dial indicator being retained frictionally in any desired rocked position, vertically or horizontally to facilitate operation and reading of the dials of the device.

The dial indicator 85 includes a pair of side plate members 98 and 99 rigidly secured to the back plate 84, an end cover plate 100 and a transparent arcuate cover plate 101. Transparent side cover plates 102 and 103 are fixed at the outside top portions of the side plate members 98 and 99 to cover the arcuate viewing slots 104 and 105 in said respective side plate members 98 and 99. In this upper portion of the dial indicator there is provided the toe indicating dial graduations 106, the movable adjustable caster indicating dial graduations 107, the fixed camber indicating dial graduations 108 adjacent the caster indicating dial 107, the fixed side camber indicating dial graduations 109. The dial 106 may be viewed through the viewing slot 104, dials 107 and 108 through the transparent arcuate cover plate 101, and the dial 109 viewed through the viewing slot 105.

The dial 106 is mounted on the arcuate support plate 110 while the dials 108 and 109 are mounted on the arcuate support block 111, both of which are rigidly supported on suitable studs 112 carried in the side plate members 98 and 99. The movable dial 107 is carried on an endless tape 113 which is supported at each end on the drive roller 114 and the idler roller 115 suitably fixed on the drive shaft 116 and idler shaft 117 journaled in the side plate member 98 the support plate 110 and the support block 111, the tape 113 being held in an upwardly deflected arcuate path by idler roller 118 and guide pins 119 suitably fixed in the support plate and block members 110 and 111. An adjusting knob 120 is fixed on the drive shaft 116 for manual setting and positioning of the dial tape 107—113.

A rock shaft 121, FIGS. 5 and 6, is journaled on suitable antifriction bearings 122 carried in the side plate members 98 and 99 to rock about the axis 123. An indicating pointer hub 124 is fixed to the rock shaft 121 by a suitable set screw 125 and has an indicating pointer 126 fixed thereto and extending outwardly over the dial 106, and having a bent over portion 127 extending indicatively over the dials 107 and 108, and a turned inwardly portion 128 moving over the dial 109 so that the pointer 126 has common reference to all of said dials.

Referring particularly to FIGS. 5, 6, 9 and 10, a rock block 129 is pivotally mounted on suitable bearings 130 carried in the side plates 98 and 99 so as to rock about the axis 131. The rock block has a lever arm 132 fixed therein by a set screw 133 the outer end of which lever arm is turned over to provide a diameter portion 134 having an axis 135 located parallel to the axes 123 and 131. The diameter portion 134 is received in a radially disposed slot 136 formed in the actuating lug 137 rigidly fixed to the rock shaft 121. A pin 138, note also FIG. 9, is journaled against axial movement in suitable bearing bores 139 formed in the rock block 129 so that the pin 138 rocks about the axis 140 lying in a plane passing through the axis 131 and located at right angles thereto. A tension hook arm 141 is fixed to the pin 138 with its axis 142 passing through the point of intersection of the axes 131 and 140. A hooked end 143 is formed on the outer end of the tension hook arm 141 to which may be attached the tension cord 144 having the tension spring 145 interconnected between the two units as shown in FIG. 1.

It will be noted that the tension hook arm has universal movement rocking about both axes 131 and 140 relative to the dial indicator 85 carried on the dial indicator frame units 22 attached to the wheels 21. In order to indicate the degree of relative swinging movement of the tension hook arm 141 about the pin axis 140 there is provided a wheel turn indicator comprising an upwardly extending post 146 rigidly fixed to the arm 71 of the U-shaped bracket 73 on the upper end of which is fixed the wheel turn angle indicating dial 147 having the angle indicating graduations 148. A rock shaft 149 is journaled in a bore 149a formed in the post 146 and has fixed on its upper end the dial hub 150 having the indicating pointer 151 indicatively related to the graduations 148 of the dial 147. The lower end of the rock shaft 149 has an offset radially disposed portion 152 terminating in the downwardly extending portion 153 which extends tangentially in contact with one side of the tension hook arm 141. A washer 154 is fixed at the lower end of the portion 153 and supports the lower hooked end 155 of the U-shaped wire 156, FIG. 8, also having an upper loop 157 surrounding the portion 153, the wire 156 extending tangentially down the opposite side of the tension hook arm 141 from the portion 153 so that horizontal relative movements of the tension hook arm will swing the indicating pointer 151 over the dial 147 while vertical relative movements of the tension hook arm 141 will have no effect on the pointer 151.

In FIGS. 15 and 16 there is shown the storage and initial calibrating rack for the device comprising a pair of parallel horizontal base pieces 159 suitably secured together by the tie rods 160 and having downwardly extending clips 161 at their ends extending over the sides of the juxtapositioned turntables 20 as best shown in FIG. 15. An upstanding frame comprising the vertical standards 162 are fixed at their lower ends to the base pieces 159 and supported thereon by the angle struts 163. An upper tie bar 164 is rigidly fixed across the top of the upright standards 162 and an intermediate tie bar 165 is similarly fixed to the standards 162. A diagonal strut 166 is fixed to the tie bars 164 and 165 as shown in FIG. 16. A hole 167 is formed in the tie bar 164 to receive the pins 42 of the dial indicator frames 22 and holes 168 are formed in the tie bar 165 to receive the locating pins 53 of said frames 22. A hole 169 is also formed in the diagonal strut 166 to receive the clamp bolt 170.

For storage and checking the dial indicator frame units for calibration, the left hand unit is placed on one side of the tie bars 164 and 165 with the pins 42 and 53 projecting through the respective holes 167 and 168 and with the locating abutment surfaces 45 and 56 of the abutment collars 43 and 54 engaging the left hand vertical faces 171 of the tie bars 164 and 165. Spacer sleeves 172 of equal length are then slipped over the projecting ends of the pins 42 and 53 of the left hand unit and engaged with the right hand vertical surfaces 173 of the tie bars 164 and 165 and then the right hand unit is presented with its pins 42 and 53 entered into the spacer sleeves 172 with the abutment surfaces 45 and 56 of the abutment collars engaging the outer ends of the sleeves 172. The clamp bolt 170 passes through the clamp plates 174 and 175 which bridge across the parallel tubes 40 so that when the wing nut 176 is tightened the units 22 are held on the frame 158 in the position described. A compression spring 177 is placed between the head 178 of the bolt 170 and the clamp plate 174 to allow limited relative adjustment for calibration between the units and the rack 158.

To calibrate the units 22 so that the indicating pointer 126 reads zero with the units on the rack 158 as described, the tension spring 145 is installed between the hooked ends 143 of the units and if the abutments 43 and 54 are properly adjusted so that their abutment surfaces 45 and 56 define planes parallel for both units and parallel to the planes defined by the axes 58 of the tubes 40, the indicating pointer 126 will show zero at 179 for camber with the dials 85 in vertical position, FIG. 3, and zero at 180 for toe when turned flat as shown in FIG. 4.

The rack 158 and dial indicating units 22 are then removed from the turntables 20.

The motor vehicle is then positioned with the front wheels located on the supporting V surfaces 34 and pointed straight ahead as described. The calibrated dial indicating frames 22 are then secured to the wheel felloes and bores 39 as described and best shown in FIGS. 3 and 4. The tension spring 145 and cords 144 are installed between the hooked ends 143 of each unit passing freely under each of the turntables and at no time contacting them. A suitable counterweight 182, FIGS. 5 and 10, adjustably fixed to the lever arm 132 counterbalances the weight of the tension hook arm, cords 144 and spring 145 for precise reading of the dials 85.

A guide pin 183 on each turntable rail 25, FIG. 3, aligns the vertical position of each dial indicator frame unit 22 slightly ahead of the V 33 in the turntable to compensate for the raising of the front axle of the vehicle above the floor level 30.

With the devices mounted as described, camber is read directly on the camber scales 108 and 109, each long line 184 representing one degree.

Caster is read, with dials in vertical position, FIG. 3, by first turning the wheel 21 in toward the center of the vehicle fifteen degrees as shown on the dial 147 then manipulating the knob 120 to adjust the caster scale zero mark 185 to the position of pointer 126 and then turn the wheel out from the center of the car fifteen degrees for a total of 30 degrees and then read the caster on dial 107, positive or negative, each line 186 representing one degree.

Toe in is read by turning the units 85 to flat or horizontal position, FIG. 4, towards the front of the vehicle and reading the toe dial 106, each lone line 187 representing one eighth inch.

It will be noted in this arrangement that the spring loaded line 144—145 stays straight while the wheels of the car and the dial indicator frame units turn while supported on the castered turntables 20 to give camber, caster and toe readings, and the degree of wheel turn in a highly accurate and precise manner resulting in a balanced wheel alignment. One wheel is actually pitted against the other in all measurements. It is to be noted that the line 144—145 from one unit to the other is at the center point of the wheels because of the three-point mounting at the wheel felloe 38 and are in relationship to each other because of the V 33, 34 and 37 in the turntables and the indicator pin 183 on the outside edge of the turntable with no rotation of the wheels taking place when the wheels are pivoted on the spindles of the steering mechanism, the wheels being locked securely in the V 33 by the tire with all movement being transferred to the casters 28.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A wheel alignment machine comprising, a pair of caster supported turntables for receiving and supporting the front wheels of a motor vehicle, means on said turntables engaging the treads of the tires of said wheels to lock said wheels against rotation on said turntables, a dial indicator frame, one for each of said wheels, including means for securing said frames to the felloe of said wheels, a dial indicator mounted on each of said frames having actuable pointers and dials associated therewith showing caster, camber, toe and angle of wheel turn, and a common tension cord actuably connected between said pointers of each dial indicator passing under said turntables and lying in a vertical plane passing through the center point of said wheels.

2. In a wheel alignment machine as set forth in claim 1 wherein there is provided in each of said dial indicators mechanism for receiving the tension from said cord independent of any relative movement of said indicating pointers of said dial indicators.

3. In a wheel alignment machine of the character described having a dial indicator frame adapted to be fixed to the wheel of a motor vehicle and a dial indicator mounted on said frame having dials and a pointer movable relative to said dials, a tension hook arm pivotally mounted on said dial indicator for universal relative movement to actuate the indicating pointers of said dial indicator, said tension hook arm being restricted against longitudinal movement in said pivotal mounting so that longitudinal pulling forces applied to said tension hook arm are inoperative to move said pointers.

4. In a wheel alignment machine as set forth having a frame adapted to be fixed to a wheel of a motor vehicle, a dial indicator pivotally mounted on said frame to rock about an axis parallel to the axis of rotation of said wheel, a tension hook arm pivotally mounted on said dial indicator for universal movement relative to the axis of swinging of said dial indicator on said frame, an indicating pointer pivotally mounted on said dial indicator adapted to be actuated by relative movement of said hook in a vertical plane of movement, indicating dials associated with said pointer showing caster, camber and toe, a second indicating pointer pivotally mounted on said frame adapted to be actuated by relative movement of said hook in a horizontal plane, and an indicating dial associated with said last mentioned pointer showing degree of wheel turn.

5. In a wheel alignment machine as set forth in claim 4 wherein said dial indicator may be swung from a vertical position of caster-camber indication from vertical relative movements of said hook to a horizontal position of toe-in indication from horizontal relative movements of said hook.

References Cited in the file of this patent

UNITED STATES PATENTS

| | | |
|---|---|---|
| 2,108,383 | Morse | Feb. 15, 1938 |
| 2,133,827 | Miller | Oct. 18, 1938 |
| 2,137,485 | Greenleaf et al. | Nov. 22, 1938 |
| 2,160,226 | Phillips | May 30, 1939 |
| 2,554,621 | Jacobsen et al. | May 29, 1951 |
| 2,627,123 | Taber | Feb. 3, 1953 |
| 2,758,385 | Martin | Aug. 14, 1956 |
| 2,882,608 | Tursman | Apr. 21, 1959 |